April 28, 1959 M. P. REHORN 2,883,906

STEREOSCOPIC SYSTEM AND APPARATUS

Filed Feb. 4, 1952 4 Sheets-Sheet 1

Fig 2-A

Miles P. Rehorn
INVENTOR.

STEREOSCOPIC SYSTEM AND APPARATUS

Filed Feb. 4, 1952

Miles P. Rehorn
INVENTOR.

INVENTOR.
Miles P. Rehorn

April 28, 1959 M. P. REHORN 2,883,906

STEREOSCOPIC SYSTEM AND APPARATUS

Filed Feb. 4, 1952 4 Sheets-Sheet 4

Miles P. Rehorn

INVENTOR.

United States Patent Office 2,883,906
Patented Apr. 28, 1959

2,883,906

STEREOSCOPIC SYSTEM AND APPARATUS

Miles Parker Rehorn, Nashville, Tenn.

Application February 4, 1952, Serial No. 269,825

16 Claims. (Cl. 88—29)

This invention relates to stereoscopic images and methods of viewing such images in three dimensional relief.

An object of the invention is to provide means for polarizing a pair of stereoscopically related images in a predetermined pattern, means for superimposing the said polarized images, and means for viewing said polarized superimposed images stereoscopically.

Another object of the invention is to provide means for presenting to the eyes of an observer in full three dimensional relief, a stereoscopic direct view television image without decreasing the original image definition of either original image and without the use of a retarding screen or filter, also without mixing the stereo views with the pseudoscopic views.

Another object of the invention is to provide means for superimposing the virtual image with the actual image of a pair of stereoscopically related light polarizing images of a particular type or pattern, and means for viewing said superimposed images in full three dimensional relief.

Other objects of the invention will be evident from the following description:

The present application is a continuation in part of my co-pending application filed August 8, 1947, Serial No. 767,569, Stereoscopic Viewing Methods and Apparatus, Patent No. 2,631,496, March 17, 1953, in which various methods of producing a composite stereoscopic image of a particular pattern of polarization are disclosed, and in which also certain means are shown for viewing said images stereoscopically and for blocking certain unwanted views.

In the patent referred to above, a polarized image of a particular and unique type is disclosed with various methods of producing and viewing said image. Fig. 1 of the present application is a schematic view of such an image which comprises a complete right eye stereoscopic image indicated by letters R, and superimposed therewith (at least to the eyes of an observer) is the corresponding complete left eye stereoscopic image indicated by the letters L. The strips *a* indicate the unit views, and the horizontal and vertical arrows 32 and 33 indicate the direction of polarization of each unit view. Notice that each right eye unit view is in contrast (with respect to direction of polarization) with the adjacent right eye unit views, also with its accompanying superimposed left eye unit view.

The present application shows additional and unique methods of producing the image of Fig. 1, also additional methods of viewing said image in stereoscopic relief, also additional methods of blocking out the "mixed views" (that is, the mixed stereoscopic and pseudoscopic views) to the eyes of an observer: for example the use of lenticular screens for this purpose.

Also there is disclosed in this application, a method similar to those already mentioned, which incorporates the use of screens having alternating opaque and transparent unit areas or alternate translucent and transparent unit areas instead of polarizing areas, for obtaining the desired stereoscopic views.

All of the above indicated additions and improvements are effected without the observer's having to wear any kind of personalized viewing aids such as goggles, lenses, filters or prisms.

Referring to the accompanying drawings.

Figure 2:
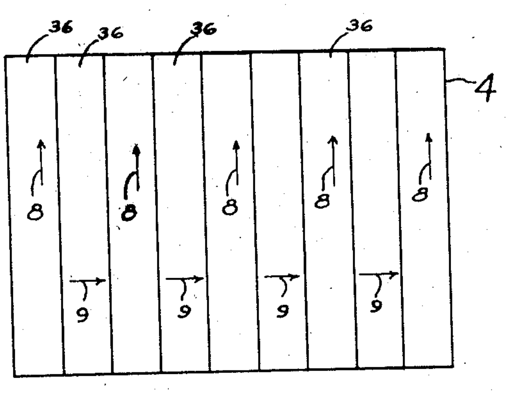
Fig. 2 is a schematic representation of the invention and its method of operation as applied to television.
Figure 2:
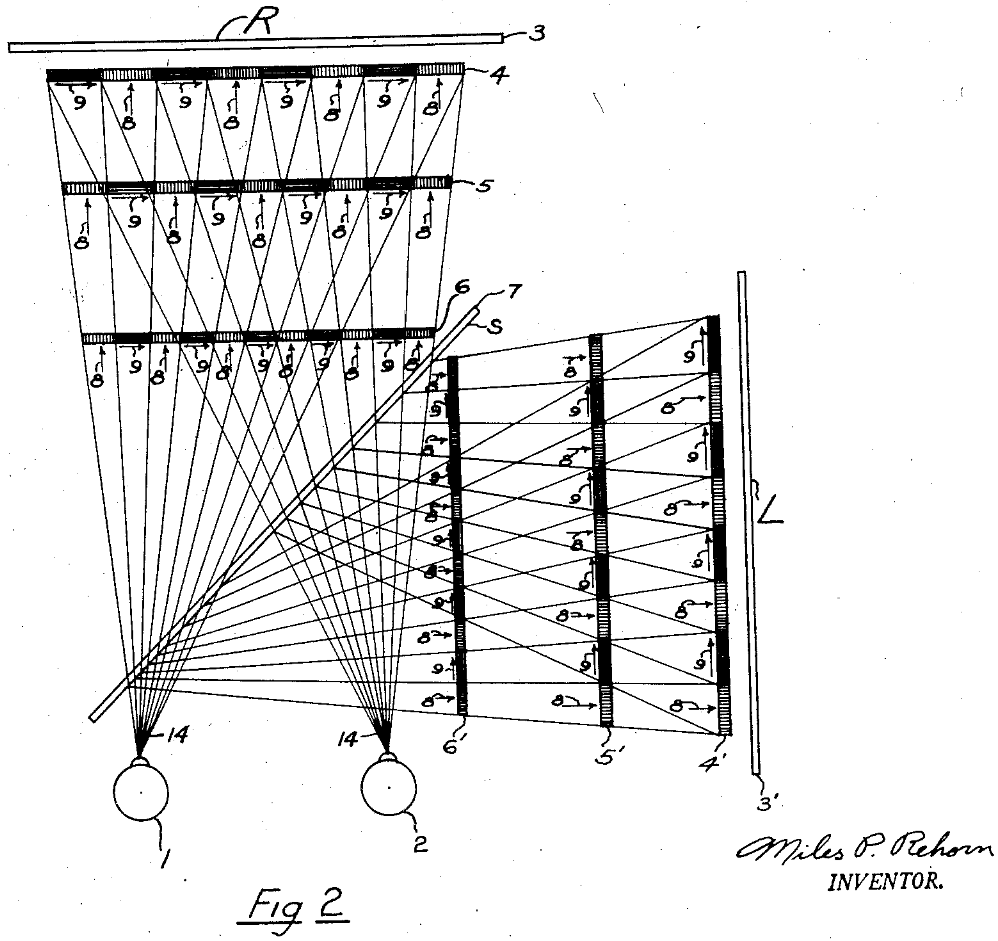

Fig. 2–A is a front view of one of the elements of Fig. 2.

Figures 3, 4:
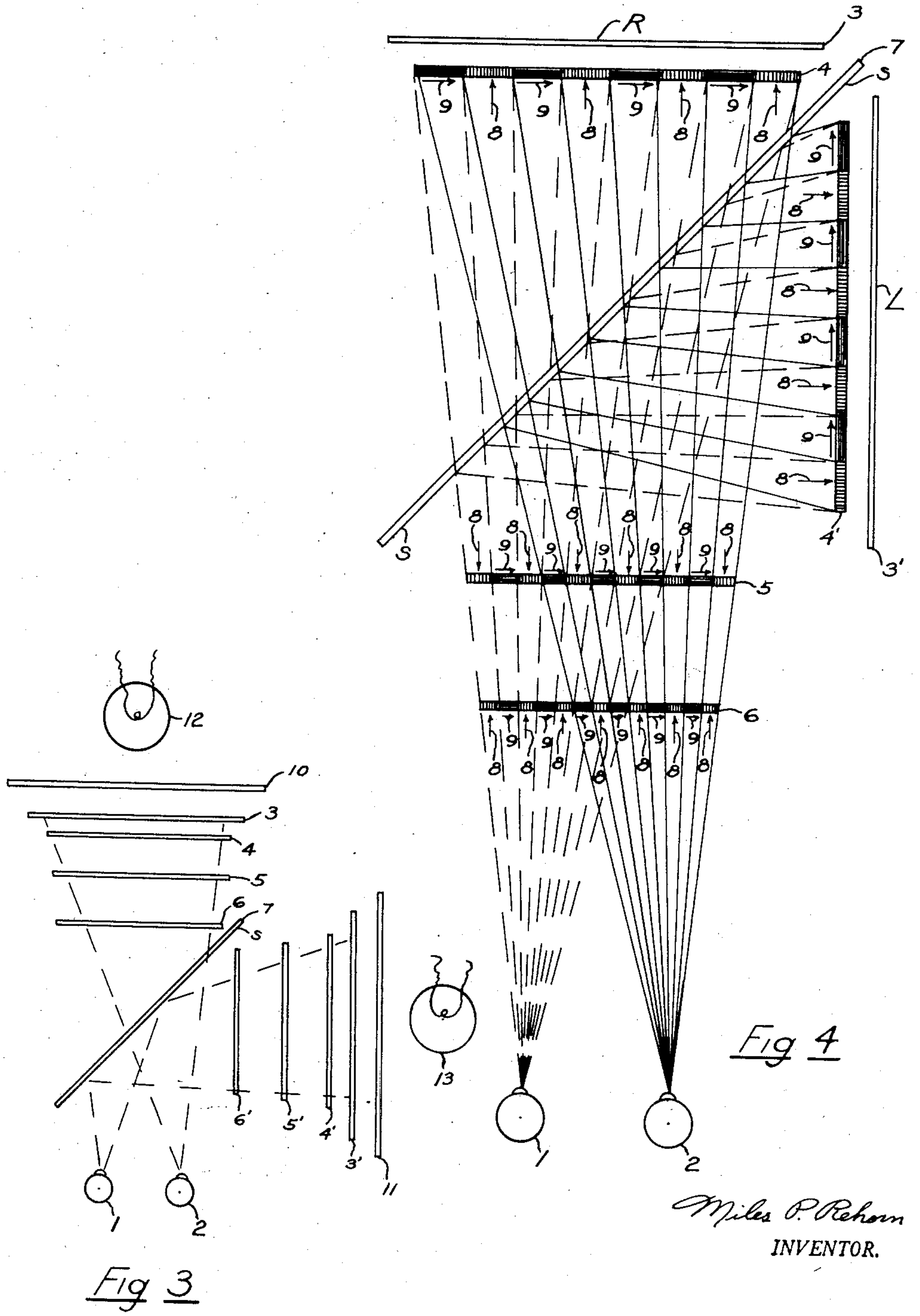

Fig. 3 is a similar representation of the invention to that of Fig. 2 as applied to a stereoscopic photographic viewer.

Fig. 4 shows a modification of the invention which is applicable either to direct view television or to photographic viewers.

Figure 5:
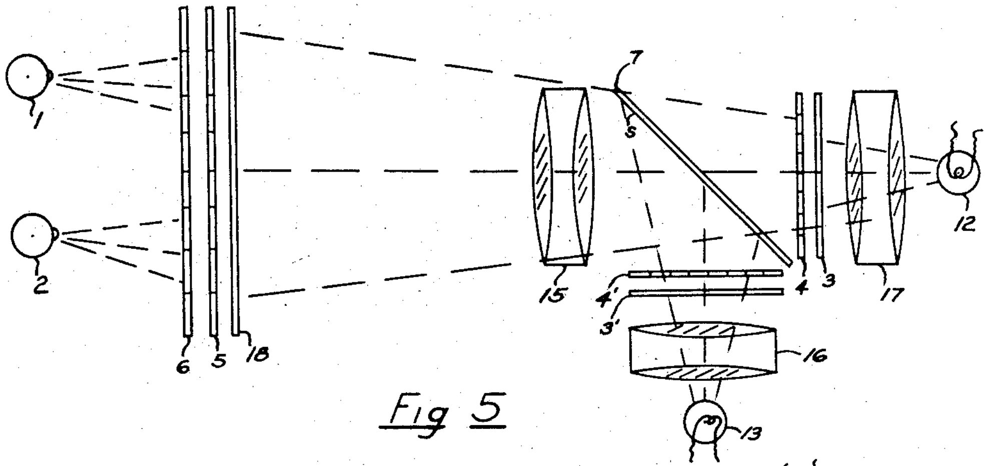
Figure 6:
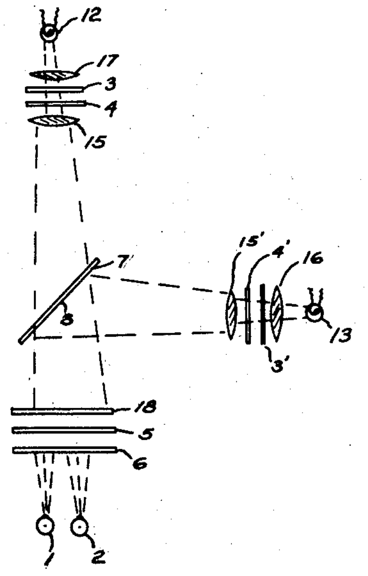
Figure 7:
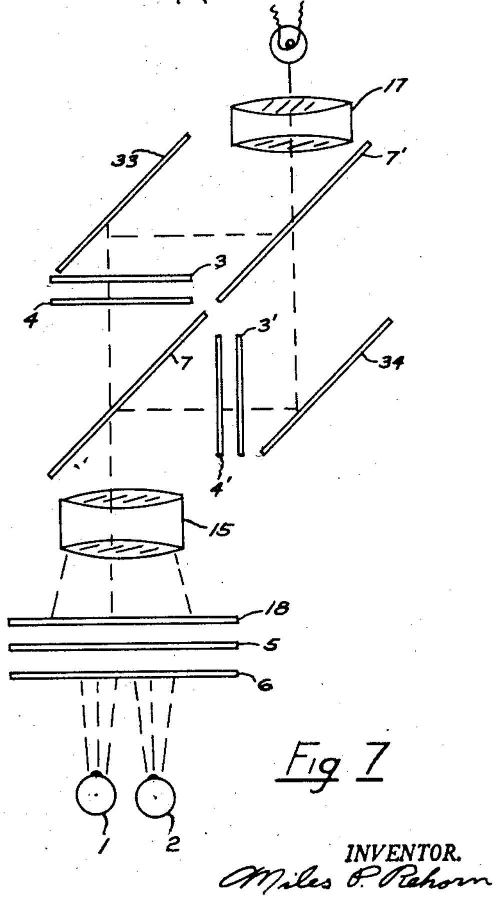

Figs. 5, 6 and 7 show still other applications of the principle illustrated in Fig. 4.

Figure 8:
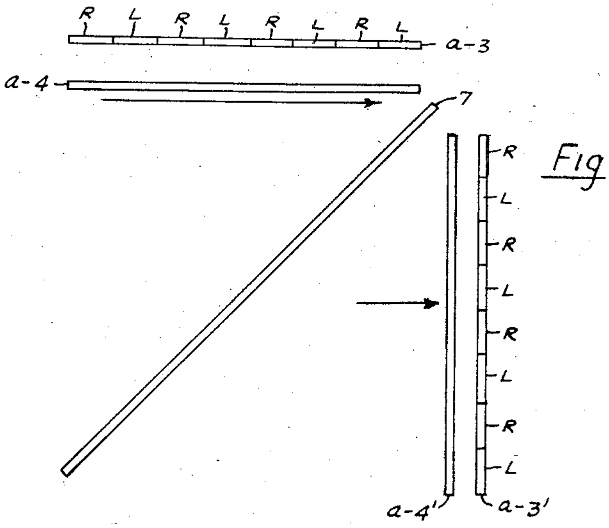

Fig. 8 illustrates a modification of the method disclosed in Fig. 2, applicable also to Figs. 3, 4, 5, 6 and 7.

Figs. 9, 10, 11 and 12 disclose various screen combinations for the purpose of adding depth to viewing distance and of blocking mixed views.

Referring to Fig. 2, the stereoscopic images 3 and 3′ appearing on the respective faces of a pair of direct view television tubes are shown. The faces of the said tubes are positioned at right angles to each other. Light polarizing screens 4, 5 and 6 are shown in spaced relation to the right eye stereoscopic image 3, and similar light polarizing screen 4′, 5′ and 6′ are shown in spaced relation to the left eye stereoscopic image 3′. A semi-transparent mirror 7 is shown at an angle of 45° to each image and to each series of light polarizing screens. Arrows 8 and 9 indicate the right angled contrast between the polarizing axes of the various polarizing elements of the screens 4, 5, 6, 4′, 5′ and 6′.

Fig. 2–A is a face view of the screen 4, showing the said polarizing elements or strips 36 with their said alternating polarizing directions indicated by the horizontal and vertical arrows 8 and 9. Screen 4′, Fig. 2, is identical with screen 4 except as shown and later described. Screens 5, 5′, 6 and 6′ are similar in construction to screens 4 and 4′ respectively, except that the polarizing strips of screens 5 and 5′ are slightly narrower than those of screens 4 and 4′, and the polarizing strips of screens 6 and 6′ are slightly narrower than those of screens 5 and 5′. The proportionate difference between strip widths varies according to the viewing distance (that is, the distance from the eyes of an observer to the plane of the screen 4).

The surface S is the reflecting surface of the half mirror 7. Radial lines 14 indicate the lines of vision as related to the eyes 1 and 2 of an observer.

The invention operates in a manner similar in principle to that disclosed in the above said co-pending patent application. The difference, however, lies in the use made of the semi-transparent mirror 7 and additional viewing screens. In the said co-pending application, the composite image (that is, the right and left eye images considered together) substantially occupy a definite image plane. But in some instances it is desirable to have the two corresponding stereoscopic aspects of the said composite image to be actually separated, while the virtual image of one said aspect is functionally in superimposed relation to the other said aspect. This is accomplished by the use made of the half mirror 7 in Fig. 2. By the 50% reflecting and the 50% transmitting properties of this mirror it becomes possible, as shown, for each eye to see its own particular stereo image through its own viewing screens independently of the other eye and its image and viewing screens.

Figure 1:
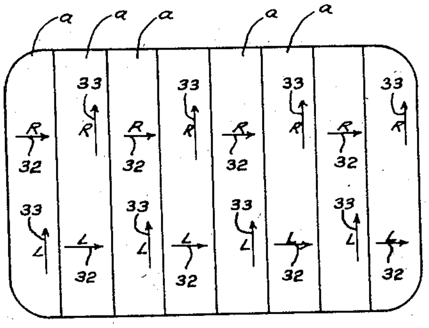
Fig. 1 shows a composite stereoscopic polarized image.

First it is necessary to cause each of the stereo images 3 and 3' to be divided into a pattern of polarization corresponding to one of the right or left eye stereoscopic aspects of said composite image (see Fig. 1). This is accomplished (referring to Fig. 2) by the polarizing screens 4 and 4'. The right eye image 3 (which is, as already pointed out, an ordinary stereo television image) is separated into unit strips with alternating directions of polarization by the polarizing strips (of the screen 4, Figs. 2 and 2–A) which alternate with respect to the directions of their polarizing axes as indicated by the arrows 8 and 9 as shown, and as previously stated.

Similarly the other stereo image 3' is acted upon by the screen 4' which is identical with screen 4 except that it is positioned so that its polarizing strips are in contrast (with respect to the direction of their polarizing axes) to the corresponding strips of the screen 4.

Omitting for the present any reference to the function of the screens 6 and 6', the screen 5 in cooperation with screen 4 permits the right eye to see the entire right eye image 3 but blocks it to the left eye by cross polarization. This action will be obvious by referring to Fig. 2 and following the radial lines 14 from the right and left eyes 2 and 1 to the image 3. Similarly the left eye, by the reflective function of the surface S of mirror 7, sees the image 3' through the cooperation of screens 4' and 5' while this image is blocked to the right eye by cross polarization.

The screens 6 and 6' cooperate together and also with screens 5 and 5' respectively, to permit the observer, by moving his head from side to side, to see only full stereoscopic views or full pseudoscopic views, but he does not see stereo views mixed with pseudoscopic views; instead he sees a darkened screen. This is a distinct advantage, for once the mixed views which are so confusing are eliminated, it is easy for the observer to select the stereo view instead of the exaggerated and grotesque pseudoscopic view.

This the polarized image of Fig. 1 is formed at the plane of the screen 4, Fig. 2, while the original images are superimposed at the plane of the image 3. The actual image 3 is, due to the action of the semi-transparent mirror 7, in superimposed relation to the virtual image of the image 3'.

Briefly, the image 3 and the image 3' are combined by the mirror 7. The combined action of the screens 4 and 4' causes these images to form the composite image of Fig. 1. The screens 5 and 5' combine their action to separate the right and left eye views for the observer. And the screens 6 and 6' combine their action to block the mixed views for the observer.

The images 3 and 3' may be television images appearing on the respective faces of a pair of direct view television receiving tubes or they may be photographs in a viewer arrangement such as shown in Fig. 3.

Here the various items of the figure are identically indicated by number the same as Fig. 2, with the exception that the translucent diffusing screens 10 and 11 are added in order to evenly diffuse the light from the light sources 12 and 13. Daylight may also furnish the light to the images 3 and 3'.

Fig. 4 shows a modification of the invention. Here the action as far as the images 3 and 3' and the screens 4 and 4' are concerned, is the same as that of Fig. 2. But screens 5' and 6' are omitted, and screens 5 and 6 are retained and moved to a position between the eyes of the observer and the half mirror 7. In the position shown, screens 5 and 6 operate similarly to the combined screens 5, 6, 5' and 6'.

Obviously the images 3 and 3' may be television images on the faces of a pair of direct view television receiving tubes. Or they may be photographs. If transparent photographs, light diffusing screens and electric lamps may be furnished, as in Fig. 3.

A further modification of the invention, as illustrated in Fig. 5, would be to substitute an objective lens 15 in the approximate position of the screens 5 and 6 of Fig. 4, and by means of light sources 12 and 13 and condenser lenses 16 and 17 placed behind the images 3 and 3'—project the two superimposed images, cross polarized in strips by the screens 4 and 4', onto a non-depolarizing projection screen 18, then by placing the screens 5 and 6 between the eyes of the observer and the said projection screen and in the proper position (that is, the same relative position as related to the resulting projected composite image (see Fig. 1) as that shown with respect to the screen 4 in Fig. 4), the observer will be enabled to see the desired stereoscopic view. This projection unit may be used either for television or motion pictures.

Or if desired the two images 3 and 3', with their polarizing filters 4 and 4', may respectively become elements of separate projection arrangements as shown in Fig. 6. Thus with separate projection lenses 15 and 15' projecting to and through the mirror 7 from some distance away from said mirror onto the non-depolarizing projection screen 18, one projected beam would pass through the mirror 7 to the projection screen 18, and the other would be reflected by the said mirror to the said projection screen. These projection units may be used either for television or motion pictures.

Fig. 7 shows an application of the invention to a convenient and economical optical arrangement. This figure differs from Fig. 5 only in the means for furnishing the light to the pair of images 3 and 3'. Here only one condenser lens 17 and one light source 12 are needed. The light beam is divided by the half mirror 7' and reflected through images 3 and 3' respectively by the mirrors 33 and 34. This optical arrangement for a projector is disclosed and claimed in my co-pending application, Serial No. 173,040, "Optical Systems," filed July 11, 1950, now Patent No. 2,669,901, issued Feb. 23, 1954.

Other applications and modifications of the invention may be resorted to without departing from its scope, such as substituting for the combination of the images 3 and 3' with the screens 4 and 4' (either in Figs. 2, 3, 4, 5, 6 or 7) a pair of light polarizing images comprising unit views which, when combined, form the composite image of Fig. 1. Such light polarizing images would not need the screens 4 and 4' and, since no additional division into unit polarizing views is needed, screens 4 and 4' could therefore be omitted. Such light polarizing images are disclosed in my co-pending application, Serial No. 767,567, "Molecularly Aligned Sheet Material and Methods of Manufacture," filed Aug. 8, 1947, now Patent No. 2,647,-440, issued Aug. 4, 1953.

Another modification of the invention is to substitute, in any of the Figures 2, 3, 4, 5, 6 or 7, a pair of ordinary interlined stereograms for the images 3 and 3' and a pair of ordinary polarizing filters for the screens 4 and 4'. Such stereograms are commonly known as bar stereograms and comprise right eye strip views alternating with left eye strip views. Fig. 8 illustrates this modification where a pair of such stereograms are indicated by *a*–3 and *a*–3' and the said polarizing filters by *a*–4 and *a*–4'. The polarizing axes of the said ordinary polarizing filters will be at right angles to each other, and each said filter will have a single polarizing direction throughout. It is obvious that such a combination will result, to the eyes of an observer, in the same composite image of Fig. 1.

In all of the applications of the invention, one of the images will need to be reversed with respect to its horizontal position in order to adjust the reversal of the reflected image by the reflecting mirror 7. In the television application it will, unless additional reflection equipment is used, be necessary for one of the scanning beams to be made to scan in reverse.

Figure 9:
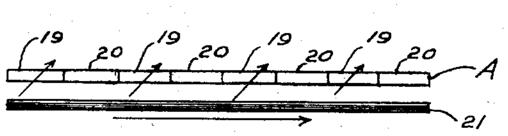

In my co-pending application, Serial No. 767,569, referred to above is disclosed a screen illustrated in Fig. 9 (present application) comprising retardation strips 19 alternating with strips 20 which are transparent and non-retarding, and a polarizing filter 21 superimposed over the said strips. It should be pointed out that in any of the Figs. 2, 3, 4, 5, 6 or 7, or in any of the above modifications of the invention where light polarizing screens such as screen 4, 5 or 6 of Fig. 2 are used, the above described screen may be substituted with similar results.

If desired, in Figs. 2, 3, 4, 5, 6 and 7 a pair of ordinary three dimensional vectograph images having their polarizing axes at right angles to each other may be substituted for the images 3 and 3′ provided a retarding screen, such as A, Fig. 9, is placed in front of each of said vectograph images. The retarding strips of the screen A, Fig. 9 will have their optical axes extended at an angle of 45° to the polarizing axis of the vectograph image which it is in front of. Also the said retarding screens will be positioned with respect to the half mirror 7 so that the retarding strips of one said screen will be superimposed to the eye of an observer with the reflected retarding strips of the other said screen. If these specifications are carried out, the same composite image of Fig. 1 will be produced to the eyes of an observer.

In all of the Figures 2, 3, 4, 5, 6 and 7, also in the various modifications disclosed thus far, screens for blocking out the unwanted mixed views are indicated. This screen is designated by the reference characters 6 and 6′ in Figs. 2 and 3; 6 in Figs. 4, 5, 6 and 7, and is shown and described in cooperative relation respectively to the screens 5 and 5′, Figs. 2 and 3; 5 in Figs. 4, 5, 6 and 7.

Figure 10:
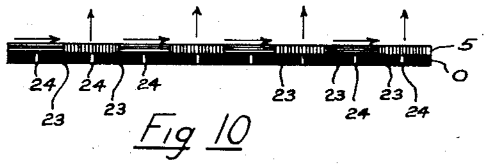

These various blocking screens may be omitted altogether if desired, leaving the observer to learn to ignore the mixed views. But a better plan is to incorporate the use of other screens of a still different type. For example, Fig. 10 shows the screen 5 of Fig. 2 with a screen O comprising long opaque strips 23 and narrow transparent slits or strips 24 positioned in the middle of the polarizing strips of the screen 5. Such a screen not only blocks the mixed views (or rather reduces them to a negligible minimum) but also lengthens the depth of viewing distance for the observer. A second screen, similar to screen O, will of course be placed before the screen 5′.

Figure 11:
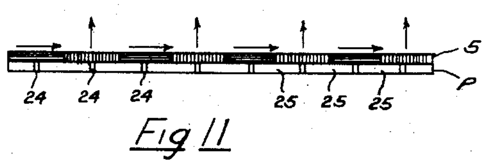

If the stereoscopically related images to be viewed are opaque photographs or prints, then the modification of Fig. 11 will be more satisfactory. In this figure the screen 5 is shown with a screen P next to it. The screen P comprises transparent slits 24 positioned as in Fig. 10, but instead of the long opaque strips 23 are long translucent strips 25. The translucent strips permit more light to pass to the images. This type screen, under certain conditions, may also be found to be advantageous with other type images than opaque ones, such for example as transparencies and projected images, or television images.

In both of the modifications just disclosed, it will be obvious that the screen 5 may be eliminated and the transparent slits 24 of Figs. 10 and 11 will become the polarizing strips having alternating contrasted directions of polarization.

Figure 12:
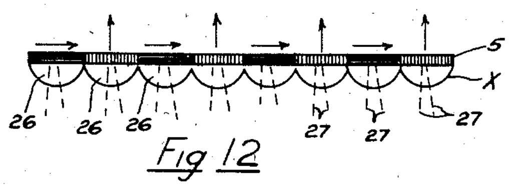

Or in certain instances if desired, as shown in Fig. 12, a lenticular screen X shown schematically with respect to its actual thickness, may be used instead of the screen O or P of Figs. 10 or 11 respectively. The manner of operation of lenticular screens is common knowledge in the stereoscopic art. Each of the lenticles 26 will be of equal width with the polarizing strips of the screen 5. And the curvature of each lenticle will be such that only a narrow slit view (indicated by dotted lines 27) is possible at a time to the eyes of an observer.

The above disclosed modifications shown in Figs. 10, 11 and 12 are also applicable to the screen 5 of Figs. 5, 6 and 7.

A method of manufacturing the screen of Fig. 11, which comprises translucent strips alternating with transparent strips, will now be disclosed: A translucent ink such as is used for marking on cellophane or cellulose acetate or glass may be applied uniformly over the surface of a glass or plastic sheet. After the translucent coating has thoroughly dried, a machine such as used for making half tone screens or diffraction gratings may be used to rule grooves in the coating. The grooves which are ruled will become transparent when the translucent coating is removed, resulting in the transparent strips 24 of Fig. 11. The remaining strips corresponding to the strips 25 of Fig. 11 will be translucent.

Vertical strips of polarizing material, retardation material, or opaque and transparent strips, or translucent and transparent strips, or lenticular strips, are not the only pattern forms which the screens 4, 5, 6, 4′, 5′, 6′; or screens O, P or X of Figs. 10, 11 or 12 may take. A checkerboard pattern, Chinese checkerboard pattern, or other pattern form may be used with less satisfactory results however.

Also in the various figures and modifications herein disclosed, which include a semi-transparent mirror, other equivalent reflecting means may be used instead. For example instead of a single said mirror, such as 7 of Fig. 2, a prism or a plurality of prisms or mirrors may be used. Such variations as here referred to are indicated in my other co-pending application (Serial No. 173,040, "Optical Systems," filed July 11, 1950, now Patent 2,669,901, February 23, 1954), and would, under certain conditions, involve positional arrangements of the stereoscopically related images other than the disclosed right angled arrangement. For example, the images may be spaced apart and in the same plane. All such modifications are included within the scope of the invention.

Also in all figures and disclosures of these specifications relative to polarizing directions, only right angled contrasts with respect to said directions is referred to. It is to be understood, however, that the contrasts may be at other angular directions and may involve circular or elliptical polarization in contrast with other circular, elliptical or angular contrasts.

Also the position of the half mirror in the various figures is not intended to be limiting. Obviously, the images may be arranged differently from that indicated with respect to their positions relative to the half mirror. For example, in Figs. 2 and 4 the left eye image may be on the opposite side by reversing the position of the semi-transparent mirror. Also by rotating the entire arrangement of Figs. 2 or 4 through 90° and then adjusting the pair of images by placing them in an upright position, the left eye image may occupy a position above or below the semi-transparent mirror. This position would be advantageous due to the fact that the half mirror could then be elongated, permitting a wide angular view of the stereoscopic image without passing off the edges of the mirror.

All the above described and indicated modifications are included within the scope of my invention.

I claim:

1. In combination, means for forming a pair of composite image views, said means comprising a pair of non-superposed stereoscopically related images and polarizing media individual to the said images at least certain parts of the media comprising optically selective unit areas, each of the said composite image views comprising a multiplicity of polarized unit views, the said unit views of each of said image views forming a uniform pattern corresponding to that of the optically selective unit areas, means comprising a semi-reflecting semi-transparent device for superimposing to the eyes of an observer the said composite views at a viewing plane, the said superposed views forming a composite stereoscopic view, and a light polarizing means through which the said composite view may be seen from different view points simultaneously and in stereoscopic relief by a plurality of observers at said view points, approximately the entire area of the said polarizing means and media being functionally common to the eyes of all said observers, the last said means including a multiplicity of unit polarizing areas which together form a pattern of polarization corresponding to the said pattern formed by the said composite stereoscopically related image views.

2. The combination defined in claim 1, the said polarizing means and media including a screen comprising a multiplicity of retardation areas spaced apart.

3. The combination defined in claim 1, the said polarizing means and media including a screen comprising a multiplicity of opaque elements alternating with transparent elements.

4. The combination defined in claim 1, the said polarizing means and media including a screen comprising a multiplicity of translucent elements alternating with transparent elements.

5. The combination defined in claim 1, the said polarizing means and media including a screen comprising a multiplicity of lenticular elements.

6. The combination defined in claim 1, the said non-superimposed images being at right angles to each other and the semi-reflecting, semi-transmitting means comprising a semi-transparent mirror which bisects the right angle formed by the said images.

7. The combination defined in claim 1, the said images being right and left eye images respectively, the said polarizing means comprising a pair of polarizing filters positioned in front of said images respectively, each said filter comprising a multiplicity of adjacently disposed polarizing elements, each said element having a single direction of polarization throughout its area, and the direction of polarization of each said element being in a contrasting direction to that of each adjoining element.

8. The combination defined in claim 1, the said images each comprising a multiplicity of right and left eye unit views and the said polarizing means comprising a pair of polarizing filters, each having a single polarizing axis, said filters being respectively superimposed with each of the said images and so positioned that one said filter polarizes light radiating from one image in one direction and the other said filter polarizes light radiating from the other image in a contrasting direction.

9. The combination defined in claim 1, the said images being light polarizing images comprising a pattern of polarization identical respectively with that of the said right and left eye image views which comprise the said stereoscopic view, the said polarizing means being a molecularly oriented film upon which the said images are formed.

10. The combination defined in claim 1, said combination including a projection means for projecting the said composite stereoscopic view on a projection screen, the said polarizing means and media being positioned in front of the said projection screen.

11. The combination according to claim 10, the said projection means comprising a light source and a condenser lens individual to one said image, a second light source and condenser lens individual to the other said image and a single objective lens through which the said composite stereoscopic view is projected.

12. The combination according to claim 10, the said projection means comprising a single light source and a single condenser lens, means for dividing the light beam from the said light source, reflecting mirrors for reflecting the divided beam to the said pair of images respectively, and an objective lens for projecting the said composite stereoscopic view to the said projection screen.

13. The combination set forth in claim 10, the said projection means comprising a light source, a condenser lens and a projection lens individual to one said image and a second light source, condenser lens and projection lens individual to the other said image, the said semi-reflecting, semi-transmitting means serving to superimpose the separate projections of the said images on the said projection screen.

14. The combination defined in claim 1, the said polarizing means and media being in two main parts, one said part being individual to one said image and the other said part being individual to the other said image, each said part being positioned beyond the said semi-reflecting, semi-transmitting means from the eyes of an observer.

15. The combination defined in claim 1, the said polarizing means and media cooperating with each of the said images and being positioned between the eyes of an observer and the said semi-reflecting, semi-transmitting means.

16. The combination defined in claim 1, and in cooperation therewith a light source and light diffusing screen individual to one said image, and a light source and light diffusing screen individual to the other said image.

References Cited in the file of this patent

UNITED STATES PATENTS

| | | |
|---|---|---|
| 1,227,462 | Luckiesh | May 22, 1917 |
| 1,963,438 | Greensfelder | June 19, 1934 |
| 1,992,872 | Mahler | Feb. 26, 1935 |
| 2,084,350 | Land | June 22, 1937 |
| 2,218,875 | Parsell | Oct. 22, 1940 |
| 2,301,254 | Carnahan | Nov. 10, 1942 |
| 2,309,879 | Willis | Feb. 2, 1943 |